Oct. 16, 1962     V. A. UNRUH     3,058,363
POWER TRANSMISSION

Filed July 14, 1959     2 Sheets-Sheet 1

Vernon A. Unruh
INVENTOR.

BY *Clarence A. O'Brien*
*and Harvey B. Jacobson*
Attorneys

Oct. 16, 1962 — V. A. UNRUH — 3,058,363
POWER TRANSMISSION
Filed July 14, 1959 — 2 Sheets-Sheet 2

Vernon A. Unruh
INVENTOR.

United States Patent Office 3,058,363
Patented Oct. 16, 1962

3,058,363
POWER TRANSMISSION
Vernon A. Unruh, R.R. 2, Great Bend, Kans.
Filed July 14, 1959, Ser. No. 826,948
9 Claims. (Cl. 74—219)

This invention relates to a new and useful power take-off for drivingly connecting a driving shaft with a driven shaft, and more particularly relates to a device which may be conveniently used to selectively, drivingly connect or completely disconnect a driving pulley and a driven pulley.

The present invention incorporates the use of a series of pulleys which are interconnected by means of endless flexible members, with one of the pulleys being so mounted so as to be selectively reversed in position with an idler pulley whereby the power of the driving shaft may be completely disconnected from the ultimately driven shaft.

In some instances, it is desirable to completely disconnect a driven shaft from a driving shaft without the use of clutching mechanisms since most clutching mechanisms are either designed in such a manner whereby at least a small amount of power is transmitted at all times or they will cease to be capable of completely disengaging a driving shaft from a driven shaft after having been used a length of time sufficient to cause appreciable wear.

The main object of this invention is to provide a power transmission which will be capable of selectively, drivingly connecting or completely disconnecting a driving shaft and a driven shaft.

A further object of this invention, in accordance wtih the preceding object, is to provide a power transmission which will completely eliminate the necessity of any clutch mechanisms.

Still another object, in accordance with the preceding objects, is to provide a power transmission which may be used in connection with a series of pulleys drivingly connected by means of endless flexible members which may be selectively manipulated to drivingly connect or completely disconnect a driving pulley and a driven pulley without effecting a change of the tensioning of any of the endless flexible members used in the transmission.

A still further object of this invention is to provide a power transmission for selectively, drivingly connecting or completely disconnecting a driving pulley and a driven pulley in such a manner whereby the power will be evenly and gradually applied to the driven pulley.

Yet another object, in accordance with the preceding objects, is to provide a power transmission for selectively drivingly connecting or completely disconnecting a driving pulley and a driven pulley that will conform to conventional forms of manufacture, be of simple construction and easy to operate so as to provide a device that will be economically feasible, relatively trouble free, and operable by non-skilled workers.

A final object to be specifically enumerated herein is to provide a power transmission for selectively, drivingly connecting or completely disconnecting a driving pulley and a driven pulley which may be conveniently adapted to be operated from a remote position.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1:
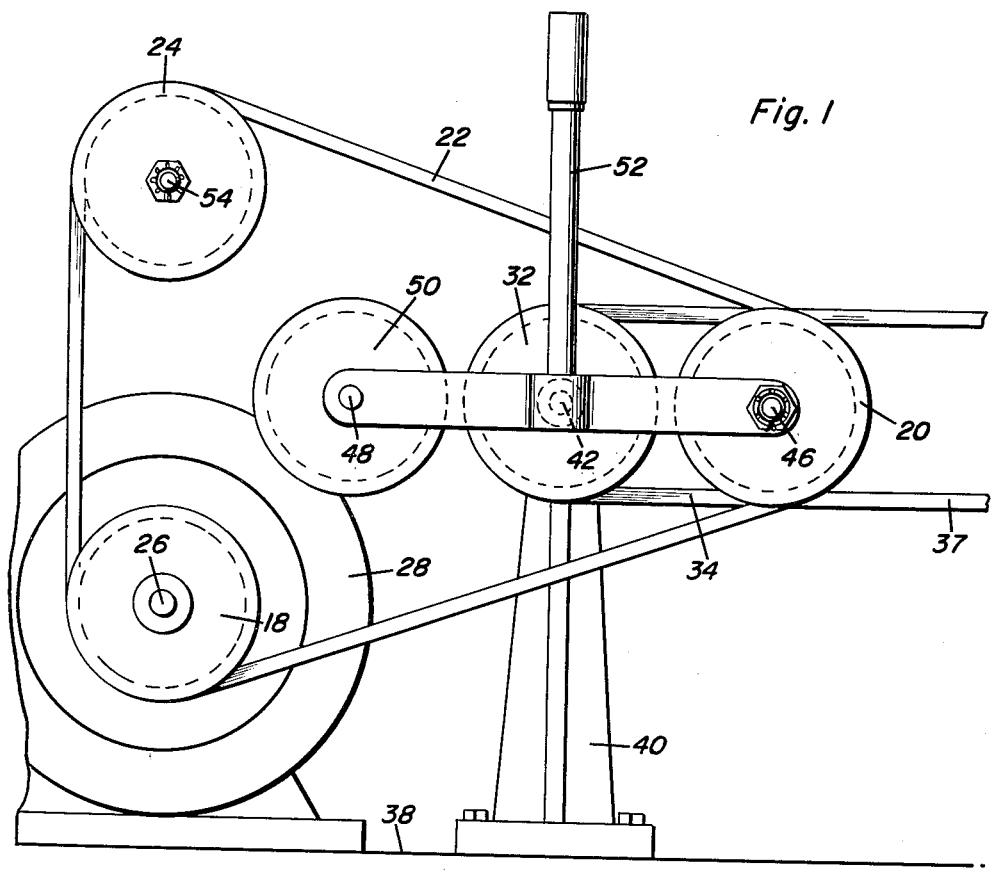
FIGURE 1 is a side elevational view of the present invention shown in a position drivingly connecting a driving shaft to a driven shaft, the latter not being shown.
Figure 2:
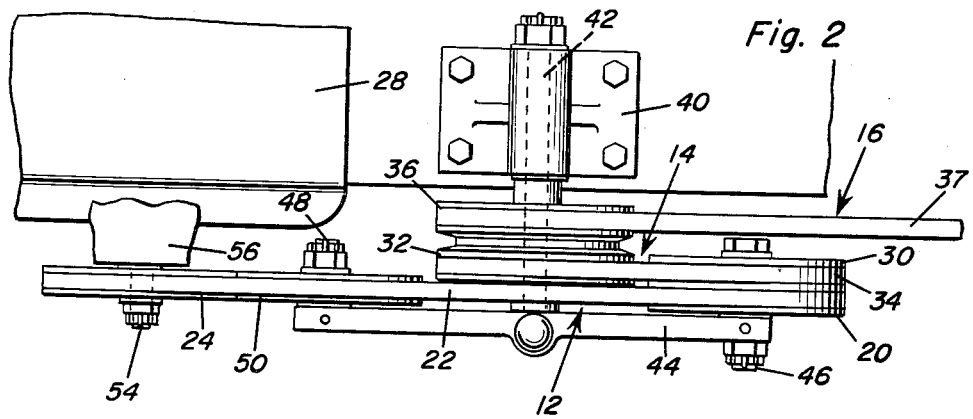
FIGURE 2 is a top plan view of the invention as seen in FIGURE 1.

Referring now more specifically to the drawings, the numeral 10 generally designates the power transmission of the instant invention which comprises first, second, and third power transmitting devices generally referred to by the reference numerals 12, 14 and 16, respectively.

The first power transmitting device 12 comprises a pair of aligned pulleys 18 and 20 which are drivingly connected by means of an endless flexible belt 22. Also included in the first power transmitting device 12 is a tensioning pulley 24, the belt 22 also being entrained about the tensioning pulley 24. The pulley 18 comprises the driving pulley of the first power transmitting device 12 and is driven by means of the shaft 26 of motor 28 on which it is secured. The driven pulley 20 of the first power transmitting device 12 is fixedly secured to the pulley 30 which comprises the driving pulley of the second power transmitting device which is drivingly connected to a driven pulley 32 by means of endless flexible belt 34. The driven pulley 32 is in turn fixedly secured to the driving pulley 36 of the third power transmitting device which is drivingly connected to the driven pulley (not shown) of the third power transmitting device 16 by means of endless flexible belt 37.

The motor 28 may be conveniently mounted in any manner upon a convenient supporting surface 38 on which there is also secured a supporting stand 40. Secured to the supporting stand 40 in any convenient manner and in parallel relation with driving shaft 26 is a shaft 42 on which pulleys 32 and 36 are rotatably journaled. Also journaled upon the shaft 42 is a support rod 44 which has secured to one end thereof a spaced distance from shaft 42 a support shaft 46 and on the other end an equal distance from the shaft 42 a support shaft 48. The shafts 46 and 48 are parallel with each other and also with shafts 26 and 42. Rotatably journaled on shaft 46 are pulleys 20 and 30, with the pulley 20 in alignment with the pulley 18, and the pulley 30 in alignment with the pulley 32. An idler pulley 50 is rotatably journaled on shaft 48 and is in alignment with pulleys 20, 24, and 18.

A handle 52 is secured to support rod 44 intermediate the ends thereof and may be manipulated to pivot pulleys 20 and 50 about the longitudinal axis of shaft 42 to reverse the positions of pulleys 20 and 50 to selectively engage or disengage the driving pulley 18 of the first power transmitting device 12 with the driven pulley (not shown) of the third power transmitting device 16.

Figure 3:
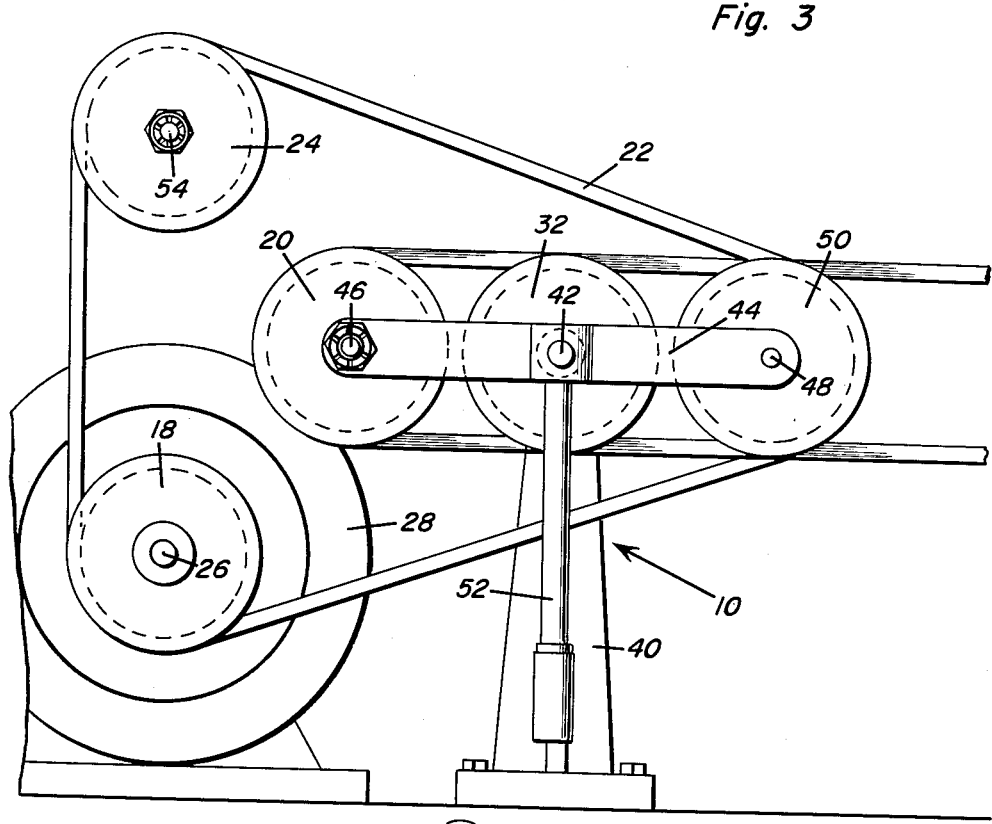
FIGURE 3 is a side elevational view of the invention like that of FIGURE 1 but with the transmission shown in position with the driving shaft disconnected from the driven shaft.
Figure 4:
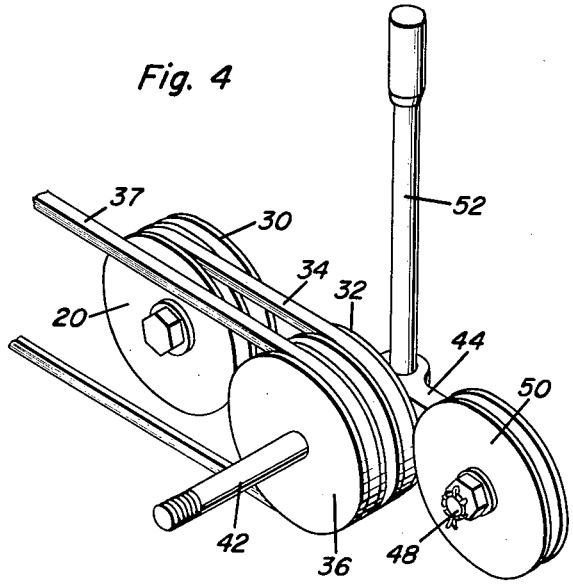
FIGURE 4 is a fragmentary perspective view of the device as seen from the reverse side of FIGURE 1, the support stand of the flexible belts being removed.

With attention now drawn more particularly to FIGURES 1 and 3 of the drawings, it will be noted that in FIGURE 1 the pulley 20 is engaged with the flexible belt 22, thereby drivingly connecting the shaft 26 to the second and third power transmitting devices 14 and 16.

In FIGURE 3, the positions of the pulleys 20 and 50 are shown reversed with the idler pulley 50 now engaging the flexible belt 22 maintaining tension thereon and the driven pulley 20 disengaged from the belt 22 to completely disengage the second and third power transmitting devices 14 and 16 from the motor shaft.

The shaft 54 on which the pulley 24 is rotatably journaled may either be fixedly secured in spaced and parallel relation with the shafts 26 and 42 or it may be conveniently mounted upon a suitable support 56 which is spring urged away from both the shafts 26 and 42 so as to maintain a predetermined tension upon the flexible belt 22 affording a means whereby the stretching of the latter may be compensated for.

It is to be understood that the preferred mounting of the shaft 54 is the manner in which it is stationarily positioned but may be moved from time to time to compensate for any stretching of the flexible belt 22. Further, it is to be understood that the shaft 54 is positioned with respect to the pulley 18 and the length of the support rod 44 whereby the tension of the belt 22 will be maintained substantially the same upon movement of either pulley 20 or 50 out of engagement with belt 22 upon the engagement of the other pulley therewith. That is, the angle formed by the reaches of belt 22 extending from pulley 20 and the length of the support rod 44 are such that as pulleys 20 and 50 are reversed in position the slack of belt 22 caused by the movement of pulley 20 toward motor 28 is taken up by the movement of pulley 50 away from motor 28. Although the transmission may be designed to produce a slight reduction in tension of belt 22 as the pulleys are reversed in position, it will be observed that the tension of belt 22 is exactly the same when the pulleys are positioned as shown in FIGURE 1 and when the pulleys are positioned as shown in FIGURE 3 since the distance from shaft 42 to shafts 46 and 48 and the size of pulleys 20 and 50 are the same.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A power transmission for selectively drivingly connecting a driving shaft with a driven shaft comprising first, second and third power transmitting devices, said power transmitting devices each comprising a driving pulley in alignment with a driven pulley, a tensioned flexible member entrained around and operatively connecting each driving pulley with its corresponding driven pulley, means drivingly connecting the driven pulley of said first device with the driving pulley of said second device, means drivingly connecting the driven pulley of said second device with the driving pulley of the third device, an idler pulley aligned with said driven pulley of said first device, means swingably and reversibly mounting said idler pulley and said driven pulley of said first device in fixed spaced positions relative to each other and for movement about an axis parallel to, equally spaced between and disposed between the axes of rotation of said idler pulley and said driven pulley of said first device whereby the positions of said last two mentioned pulleys may be selectively reversed to alternately engage said last mentioned driven pulley and said idler pulley with said flexible member of said first device while maintaining the flexible member of said first device in a tensioned state, a tensioning pulley aligned with said idler pulley, said flexible member of said first device also entrained over said tensioning pulley and laterally outwardly deflected thereby, whereby said flexible member of said first device includes three angulated reaches disposed in a triangle, one of the apices of said triangle formed and maintained by the selected engagement of said driven pulley of said first device and said idler pulley with said flexible member of said first device.

2. The combination of claim 1 including means maintaining the driving and driven pulleys of said second device in fixed spaced relation to each other.

3. A power transmission for selectively drivingly connecting a driving shaft with a driven shaft comprising first, second and third power transmitting devices, said power transmitting devices each comprising a driving pulley in alignment with a driven pulley, a tensioned flexible member entrained about and operatively connecting each driving pulley with its corresponding driven pulley, the driven pulley of said first device and the driving pulley of said second device being secured together in side-by-side relation to form a double pulley, the driven pulley of said second device and the driving pulley of the third device being secured together in side-by-side relation to form a double pulley, an idler pulley aligned with said driven pulley of said first device, means swingably and reversibly mounting said idler pulley and said driven pulley of said first device in fixed spaced positions relative to each other and for movement about an axis parallel to, equally spaced between and disposed between the axes of rotation of said idler pulley and said driven pulley of said first device whereby the positions of said last two mentioned pulleys may be selectively reversed to alternately engage said last mentioned driven pulley and said idler pulley with said flexible member of said first device while maintaining the flexible member of said first device in a tensioned state, a tensioning pulley aligned with said idler pulley, said flexible member of said first device also entrained over said tensioning pulley and laterally outwardly deflected thereby, whereby said flexible member of said first device includes three angulated reaches disposed in a triangle, one of the apices of said triangle formed and maintained by the selected engagement of said driven pulley of said first device and said idler pulley with said flexible member of said first device.

4. The combination of claim 3 wherein said reversible mounting means includes a support member, a shaft secured in said support member, the double pulley connecting said second and third devices journaled on said shaft, a support rod journaled on said shaft intermediate its ends, means mounting the other double pulley on one end of said rod a spaced distance from said shaft, and means mounting said idler pulley on the other end of said rod an equal distance from said shaft and in alignment with the flexible member of said first device whereby the rod may be rotated to selectively reverse the positions of the idler pulley and driven pulley of the first device and move one of the last two mentioned pulleys into engagement with the flexible member of the first device while disengaging the other.

5. The combination of claim 4 wherein said tensioning pulley is positioned a spaced distance from each of said driving and driven pulleys of said first device and to one side of a line extending between the centers of said last mentioned pulleys a distance sufficient to maintain substantially the same tensioning of the flexible member of said first device while reversing the positions of the idler pulley and driven pulley of said first device.

6. A power transmission for selectively drivingly connecting a driving shaft with a driven shaft comprising first and second power transmitting devices, said power transmitting devices each comprising a driving pulley in alignment with a driven pulley, a tensioned flexible member entrained around and operatively connecting each driving pulley with its corresponding driven pulley, means drivingly connecting the driven pulley of said first device with the driving pulley of said second device, an idler pulley aligned with said driven pulley of said first device, means swingably and reversibly mounting said idler pulley and said driven pulley of said first device in fixed spaced positions relative to each other and for movement about an axis parallel to, equally spaced between and disposed between the axes of rotation of said idler pulley and said driven pulley of said first device whereby the positions of said last two mentioned pulleys may be selectively reversed to alternately engage said last mentioned driven pulley and said idler pulley with said flexible member of said first device while maintaining the flexible member of said first device in a tensioned state, a tensioning pulley aligned with said idler pulley, said flexible member of said first device also entrained over said tensioning pulley and laterally outwardly deflected thereby, whereby said flexible member of said first device includes three angulated reaches disposed in a triangle, one of the apices of said triangle formed and maintained by the selected engagement of said driven pulley of said first device and said idler pulley with said flexible member of said first device.

7. The combination of claim 6 including means maintaining the driving and driven pulleys of said second device in fixed spaced relation.

8. A power transmission for selectively drivingly connecting a driving shaft with a driven shaft comprising a power transmitting device including a driving pulley in alignment with a driven pulley, a tensioned flexible member entrained about and operatively connecting said driving and driven pulleys, an idler pulley aligned with said driven pulley, and means swingably and reversibly mounting said idler pulley and driven pulley in fixed spaced positions relative to each other and for movement about an axis parallel to, equally spaced between and lying on a straight line between the axes of rotation of said idler and driven pulleys whereby the positions of said driven and idler pulleys may be selectively reversed to selectively engage and disengage said driven pulley with said flexible member while maintaining the flexible member in a tensioned state, a tensioning pulley aligned with said idler pulley, said flexible member also entrained over said tensioning pulley and laterally outwardly deflected by the latter, whereby said flexible member includes three angulated reaches disposed in a triangle, one of the apices of said triangle being maintained by the selected engagement of said driven pulley and said idler pulley with said flexible member.

9. A power transmission for selectively drivingly connecting a driving shaft with a driven shaft comprising first and second power transmitting devices, said power transmitting devices each comprising a driving pulley in alignment with a driven pulley, a tensioned flexible member entrained around and operatively connecting each driving pulley with its corresponding driven pulley, the driven pulley of said first device and the driving pulley of said second device being rigidly secured together in side-by-side relation, an idler pulley aligned with said driven pulley of said first device, means swingably and reversibly mounting said idler pulley and said driven pulley of said first device in fixed spaced positions relative to each other and for movement about an axis parallel to, equally spaced between and disposed between the axes of rotation of said idler pulley and said driven pulley of said first device whereby the positions of said last two mentioned pulleys may be selectively reversed to alternately engage said last mentioned driven pulley and said idler pulley with said flexible member of said first device while maintaining the flexible member of said first device in a tensioned state, a tensioning pulley aligned with said idler pulley, said flexible member of said first device also entrained over said tensioning pulley and laterally outwardly deflected thereby, whereby said flexible member of said first device includes three angulated reaches disposed in a triangle, one of the apices of said triangle formed and maintained by the selected engagement of said driven pulley of said first device and said idler pulley with said flexible member of said first device.

References Cited in the file of this patent
UNITED STATES PATENTS

| | | |
|---|---|---|
| 2,474,457 | Barth | June 28, 1949 |
| 2,603,979 | Du Pont | July 22, 1952 |
| 2,879,639 | Butcher | Mar. 31, 1959 |